United States Patent
Liu et al.

(10) Patent No.: US 8,375,165 B2
(45) Date of Patent: Feb. 12, 2013

(54) BIT WEAVING TECHNIQUE FOR COMPRESSING PACKET CLASSIFIERS

(75) Inventors: Xiang-Yang A. Liu, Okemos, MI (US); Chad R. Meiners, East Lansing, MI (US); Eric Torng, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 232 days.

(21) Appl. No.: 12/985,407

(22) Filed: Jan. 6, 2011

(65) Prior Publication Data

US 2012/0096220 A1 Apr. 19, 2012

Related U.S. Application Data

(60) Provisional application No. 61/293,360, filed on Jan. 8, 2010.

(51) Int. Cl.
*G06F 12/00* (2006.01)
(52) U.S. Cl. ........................................ 711/108; 711/173
(58) Field of Classification Search .................. None
See application file for complete search history.

(56) References Cited

U.S. PATENT DOCUMENTS

| 6,385,649 B1 | 5/2002 | Draves et al. |
| 2006/0277601 A1 | 12/2006 | Gouda et al. |

OTHER PUBLICATIONS

Q. Dong et al "Packet Classifiers in Ternary CAMS Can Be Smaller", Sigmetrics/Performance '06, Jun. 26-30, 2006.
R. McGeer et al "Minimizing Rulesets for TCAM Implementation", INFOCOM 2009, IEEE, Apr. 2009.

*Primary Examiner* — Shawn X Gu
(74) *Attorney, Agent, or Firm* — Harness, Dickey & Pierce, P.L.C.

(57) ABSTRACT

An improved technique is provided for compressing a packet classifier for a computer network system. A set of packet classification rules is first partitioned into one or more partitions. For each partition, columns of bits in each of the ternary strings of a given partition are reordered, the ternary strings within each partition are consolidated into one or more replacement strings and then the columns of bits of the replacement strings are rearranged back to the starting order. The rearranged replacement strings from each of the partitions are appended together to form a compressed packet classifier which may be instantiated in a content-addressable memory device.

25 Claims, 4 Drawing Sheets

BIT WEAVING TECHNIQUE FOR COMPRESSING PACKET CLASSIFIERS

CROSS-REFERENCE TO RELATED APPLICATIONS

This application claims the benefit of U.S. Provisional Application No. 61/293,360 filed on Jan. 8, 2010. The entire disclosure of the above application is incorporated herein by reference.

FIELD

The present disclosure relates to improved techniques for compressing packet classifiers.

BACKGROUND

Packet classification is the core mechanism that enables many networking devices, such as routers and firewalls, to perform services such as packet filtering, virtual private networks (VPNs), network address translation (NAT), quality of service (QoS), load balancing, traffic accounting and monitoring, differentiated services (Diffserv), etc. The essential problem is to compare each packet with a list of predefined rules, which we call a packet classifier, and find the first (i.e., highest priority) rule that the packet matches. Table 1 below shows an example packet classifier of three rules. The format of these rules is based upon the format used in access control lists (ACLs), such as those found on Cisco routers. In this disclosure, the terms packet classifiers, ACLs rule lists, and lookup tables are used interchangeably.

TABLE 1

An example packet classifier

| Rule | Source IP | Dest. IP | Source Port | Dest. Port | Protocol | Action |
|---|---|---|---|---|---|---|
| $r_1$ | 1.2.3.0/24 | 162.168.0.1 | [1.65534] | [1.65534] | TCP | accept |
| $r_2$ | 1.2.11.0/24 | 192.168.0.1 | [1.65534] | [1.65534] | TCP | accept |
| $r_3$ | * | * | * | * | * | discard |

Hardware-based packet classification using Ternary Content Addressable Memories (TCAMs) is now the de facto industry standard. TCAM-based packet classification is widely used because Internet routers need to classify every packet on the wire. Although software based packet classification has been extensively studied, these techniques cannot match the wire speed performance of TCAM-based packet classification systems.

As a traditional random access memory chip receives an address and returns the content of the memory at that address, a TCAM chip works in a reverse manner. That is, it receives content and returns the address of the first entry where the content lies in the TCAM in constant time (i.e., a few clock cycles). Exploiting this hardware feature, TCAM-based packet classifiers store a rule in each entry as an array of 0's, 1's, or *'s (don't-care values). A packet header (i.e., a search key) matches an entry if and only if their corresponding 0's and 1's match. Given a search key to a TCAM, the hardware circuits compare the key with all its occupied entries in parallel and return the index (or the content, depending on the chip architecture and configuration,) of the first matching entry.

Although TCAM-based packet classification is currently the de facto standard in industry, TCAMs do have several limitations. First, TCAM chips have limited capacity. The largest available TCAM chip has a capacity of 36 megabits (Mb). Smaller TCAM chips are the most popular due to the other limitations of TCAM chips stated below. Second, TCAMs require packet classification rules to be in ternary format. This leads to the well-known range expansion problem, i.e., converting packet classification rules to ternary format results in a much larger number of TCAM rules, which exacerbates the problem of limited capacity TCAMs. In a typical packet classification rule, the three fields of source and destination IP addresses and protocol type are specified as prefixes (e.g., 1011****) where all the *s are at the end of the ternary string, so the fields can be directly stored in a TCAM. However, the remaining two fields of source and destination port numbers are specified in ranges (i.e., integer intervals such as [1, 65534]), which need to be converted to one or more prefixes before being stored in a TCAM. This can lead to a significant increase in the number of TCAM entries needed to encode a rule. For example, 30 prefixes are needed to represent the single range [1, 65534], so 30×30=900 TCAM entries are required to represent the single rule $r_1$ in Table 1. Third, TCAM chips consume lots of power. The power consumption of a TCAM chip is about 1.85 Watts per Mb. This is roughly 30 times larger than a comparably sized SRAM chip. TCAMs consume lots of power because every memory access searches the entire active memory in parallel. That is, a TCAM is not just memory, but memory and a (very fast) parallel search system. Fourth, TCAMs generate lots of heat due to their high power consumption. Fifth, a TCAM chip occupies a large footprint on a line card. A TCAM chip occupies 6 times (or more) board space than an equivalent capacity SRAM chip. For networking devices such as routers, area efficiency of the circuit board is a critical issue. Finally, TCAMs are expensive, costing hundreds of dollars even in large quantities. TCAM chips often cost more than network processors. The high price of TCAMs is mainly due to their large die area, not their market size. Power consumption, heat generation, board space, and cost lead to system designers using smaller TCAM chips than the largest available. For example, TCAM components are often restricted to at most 10% a of an entire board's power budget, so a 36 Mb TCAM may not be deployable on all routers due to power consumption reasons.

While TCAM-based packet classification is the current industry standard, the above limitations imply that existing TCAM-based solutions may not be able to scale up to meet the future packet classification needs of the rapidly growing Internet. Specifically, packet classifiers are growing rapidly in size and width due to several causes. First, the deployment of new Internet services and the rise of new security threats lead to larger and more complex packet classification rule sets. While traditional packet classification rules mostly examine the five standard header fields, new classification applications begin to examine addition fields such as classifier-id, protocol flags, ToS (type of service), switch-port numbers, security tags, etc. Second, with the increasing adoption of IPv6, the number of bits required to represent source and destination IP address will grow from 64 to 256. The size and width growth of packet classifiers puts more demand on TCAM capacity, power consumption, and heat dissipation.

To address the above TCAM limitations and ensure the scalability of TCAM-based packet classification, the TCAM-based classifier compression problem has been studied; that is, given a packet classifier, efficiently generate a semantically equivalent packet classifier that requires fewer TCAM entries. Note that two packet classifiers are (semantically) equivalent if and only if they have the same decision for every packet. TCAM-based classifier compression helps to address the limited capacity of deployed TCAMs because reducing the number of TCAM entries effectively increases the fixed capacity of a chip. Reducing the number of rules in a TCAM directly reduces power consumption and heat generation because the energy consumed by a TCAM grows linearly with the number of ternary rules it stores. Finally, TCAM-based classifier compression lets us use smaller TCAMs, which results in less power consumption, less heat generation, less board space, and lower hardware cost.

Several prior TCAM-based classifier compression schemes have been developed. While these techniques vary in effectiveness, they all suffer from one fundamental limitation: they only produce prefix classifiers, which means they all miss some opportunities for compression. Therefore, it is desirable to provide a new TCAM-based classifier compression scheme that is not limited to producing prefix classifiers.

This section provides background information related to the present disclosure which is not necessarily prior art.

SUMMARY

An improved technique is provided for compressing a packet classifier for a computer network system. A set of packet classification rules is first partitioned into one or more partitions. For each partition, columns of bits in each of the ternary strings of a given partition are reordered, the ternary strings within each partition are consolidated into one or more replacement strings and then the columns of bits of the replacement strings are rearranged back to the starting order. The rearranged replacement strings from each of the partitions are appended together to form a compressed packet classifier which may be instantiated in a content-addressable memory device.

In one aspect of the disclosure, the columns of bits are arranged to form ternary strings having a prefix format.

In another aspect of the disclosure, the ternary strings are consolidated by merging ternary strings that differ by one bit together.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

Figure 1:
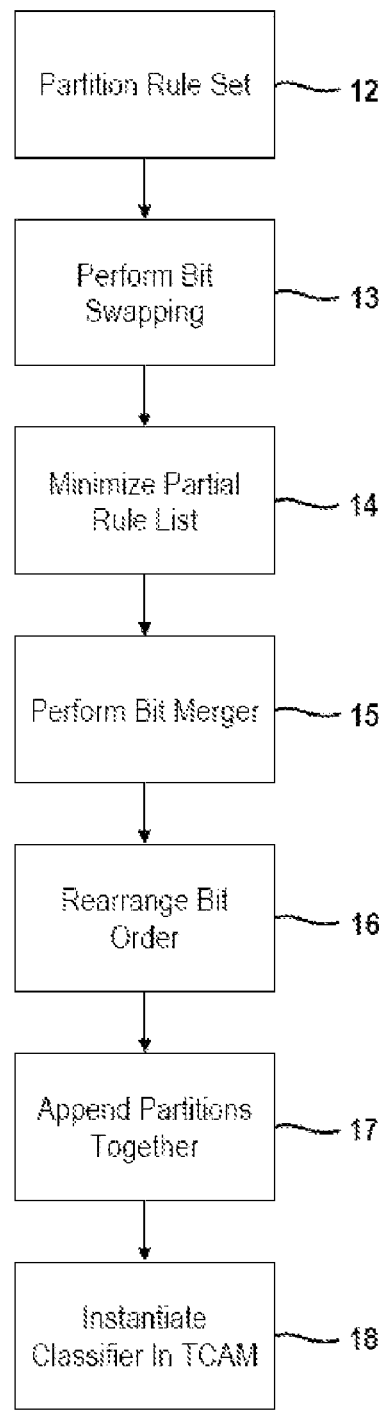
FIG. 1 is a flowchart depicting an improved method for compressing packet classifiers.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

FIG. 1 depicts an improved method for compressing packet classifiers that is not limited to producing prefix classifiers (and is referred to herein as "bit weaving"). Premise behind bit weaving is that adjacent TCAM entries that have a hamming distance of one (i.e., differ by only one bit) can be merged into one entry by replacing the bit in question with a wildcard character (e.g., *). While reference is made throughout this disclosure to ternary content addressable memory (TCAM), concepts disclosed herein are applicable to other types of content addressable memory, random access memory or combinations thereof.

Bit weaving applies two new techniques, bit swapping and bit merging, to first identify and then merge such rules together. Bit swapping first cuts a rule list at 12 into a series of partitions. Within each partition, a single permutation is applied at 13 to each rule's predicate to produce a reordered rule predicate, which forms a single prefix where all *'s are at the end of the rule predicate. This single prefix format allows the use of existing dynamic programming techniques to find a minimal TCAM table for each partition in polynomial time. Bit merging then searches each partition and merges together rules at 15 that differ by a single bit. Upon completing bit merging, all ternary strings are reverted back at 16 to their original bit permutation and appended together at 17 to form a compressed packet classifier. Lastly, the packet classifier is instantiated at 18 in a content-addressable memory device.

Figure 2:
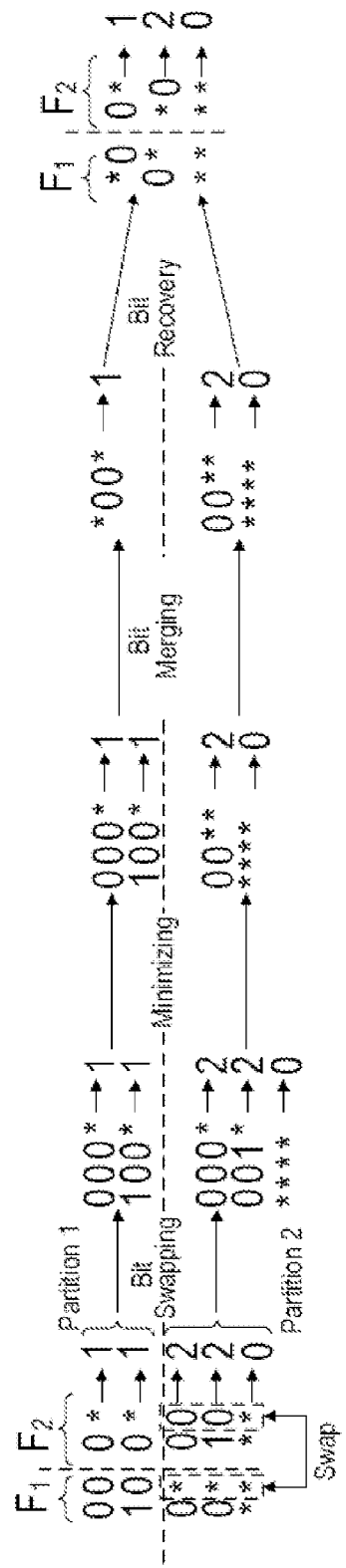
FIG. 2 is a diagram illustrating the bit weaving technique.

An example of the bit weaving approach is further illustrated in FIG. 2. In this example, the input classifier has 5 prefix rules with three decisions (0, 1, and 2) over two fields $F_1$ and F2, where each field has two bits. The bit weaving approach compresses this minimal prefix classifier with 5 rules down to 3 ternary rules as follows. First, it cuts the input prefix classifier into two partitions; the first partition consists of the first 2 rules, and the second partition consists the remaining 3 rules. Second, it treats each partition as a one-dimensional ternary rule list and swaps bit columns in each partition to make each partition a list of one-dimensional prefix rules. In this example, the first partition requires no bit swapping because it is already a list of one-dimensional prefix rules. For the second partition, it swaps the second and the fourth columns. These two steps are referred to as bit swapping. Third, each partition may be treated as a one-dimensional prefix rule list and minimized to its minimal prefix representation. In this example, the second partition is minimized to 2 rules. Fourth, in each partition, rules that differ by a single bit are detected and merged together. This step is referred to as bit merging. Finally, each partition is reverted back to its original bit order. In this example, for the second partition after minimization, the second and the fourth columns are swapped again to recover the original bit order. The final output is a ternary packet classifier with only 3 rules.

Next the concepts of fields, packets, and packet classifiers are formally defined below. A field $F_i$ is a variable of finite length (i.e., of a finite number of bits). The domain of field $F_i$ of w bits, denoted $D(F_i)$, is $[0, 2^w-1]$. A packet over the d fields $F_1, \ldots, F_d$ is a d-tuple $(p_1, \ldots, p_d)$ where each $p_i$ ($1 \leq i \leq d$) is an element of $D(F_i)$. Packet classifiers usually check the following five fields: source IP address, destination IP address, source port number, destination port number, and protocol type. The lengths of these packet fields are 32, 32, 16, 16, and 8, respectively. It is understood that the bit weaving approach is applicable to classifiers having different fields and/or field with differing lengths. $\Sigma$ is used to denote the set of all packets over fields $F_i, \ldots, F_d$. It follows that $\Sigma$ is a finite set and $|\Sigma|=|D(F_1)| \times \ldots \times |D(F_d)|$, where $|\Sigma|$ denotes the number of elements in set $\Sigma$ and $|D(Fi)|$ denotes the number of elements in set $D(F_i)$.

A rule has the form (predicate)→(decision). A (predicate) defines a set of packets over the fields $F_1$ through $F_d$, and is specified as $F_1, \in S_1 \wedge \ldots \wedge F_d \in S_d$ where each $S_i$, is a subset of $D(F_i)$ and is specified as either a ternary string, a prefix or a nonnegative integer interval. A ternary string $\{0, 1, *\}^k$ denotes the set of integers whose binary representation matches the ternary string. For purposes of matching, the * is treated as a wild card. For example, the string *0 denotes the set $\{0, 2\}$. A prefix $\{0, 1\}^k\{*\}^{w-k}$ with k, leading 0 s or 1 s for a packet field of length w denotes the integer interval $[\{0, 1\}^k\{0\}^{w-k}, \{0, 1\}^k\{1\}^{w-k}]$ and is a special case of a ternary string. For example, prefix 01** denotes the interval [0100, 0111]. In other words, a prefix rule is a rule in which each field is specified as a prefix bit string, where * all appear at the end of the string in the least significant bit positions. A rule $F_1, \in S_1 \wedge \ldots \wedge F_d \in S_d \rightarrow$(decision) is a prefix rule if and only if each $S_i$, is a prefix, and a rule is a ternary rule if and only if each $S_i$ is a ternary string. Every prefix rule is a ternary rule, but not vice versa.

A packet matches a rule if and only if the packet matches the predicate of the rule. A packet $(p_1, \ldots, p_d)$ matches a predicate $F_1, \in S_1 \wedge \ldots \wedge Fd \in S_d$ if and only if the condition $p_1, \in S_1 \wedge \ldots \wedge pd \in S_d$ holds. DS is used to denote the set of possible values that (decision) can be. Typical elements of DS include accept, discard, accept with logging, and discard with logging.

A sequence of rules $(r_1, \ldots, r_n;)$ is complete if and only if for any packet p, there is at least one rule in the sequence that p matches. To ensure that a sequence of rules is complete and thus a packet classifier, the predicate of the last rule is usually specified as $F_1 \in D(F_1) \wedge \ldots F_d \in D(F_d)$. A packet classifier C is a sequence of rules that is complete. The size of C, denoted |C|, is the number of rules in C. A packet classifier C is a prefix packet classifier if and only if every rule in C is a prefix rule, and a packet classifier C is a ternary packet classier if and only if every rule in C is a ternary rule. Every prefix classifier is a ternary classifier, but not vice versa.

Two rules in a packet classifier may overlap; that is, a single packet may match both rules. Furthermore, two rules in a packet classifier may conflict; that is, the two rules not only overlap but also have different decisions. Packet classifiers typically resolve such conflicts by employing a first-match resolution strategy where the decision for a packet p is the decision of the first (i.e., highest priority) rule that p matches in C. The decision that packet classifier C makes for packet p is denoted C(p).

A packet classifier C can be thought of as defining a many-to-one mapping function from $\Sigma$ to DS. Two packet classifiers $C_1$ and $C_2$ are equivalent, denoted $C1 \equiv C2$, if and only if they define the same mapping function from $\Sigma$ to DS that is, for any packet $p \in \Sigma$, $C1(p)=C2(p)$. For any classifier C, denote the set of equivalent classifiers as $\{C\}$. A rule is redundant in a classifier if and only if removing the rule does not change the semantics of the classifier.

In a typical packet classifier rule, the fields of source IP, destination IP, and protocol type are specified in prefix format, which can be directly stored in TCAMs; however, the remaining two fields of source port and destination port are specified as ranges (i.e., non-negative integer intervals), which are typically converted to prefixes before being stored in TCAMs. This leads to range expansion, the process of converting a non-prefix rule to prefix rules. In range expansion, each field of a rule is first expanded separately. The goal is to find a minimum set of prefixes such that the union of the prefixes corresponds to the range. For example, if one 3-bit field of a rule is the range [1, 6], a corresponding minimum set of prefixes would be 001, 01*, 10*, 110. The worst-case range expansion of a w-bit range results in a set containing 2w−2 prefixes. The next step is to compute the cross product of the set of prefixes for each field, resulting in a potentially large number of prefix rules.

Given these formal definitions, the bit swapping technique is described in more detail. A bit-swap $\beta$ of a length m ternary string t, is a permutation of the m ternary bits; that is, $\beta$ rearranges the order of the ternary bits t. The resulting permuted ternary string is denoted $\beta(t)$. For example, if $\beta$ is permutation 312 and string t is 0*1, then $\beta(t)=10*$. For any length m string, there are m! different permutations and thus m! different bit-swaps. A bit-swap $\beta$ of a ternary string t is a prefix bit-swap if the permuted string $\beta(t)$ is in prefix format. Let P(t) denote the set of prefix bit-swaps for ternary string t: specifically, the bit-swaps that move the * bits of t to the end of the string.

A bit-swap $\beta$ can be applied to a list l of ternary strings $(t_1, \ldots, t_n)$ where l is typically a list of consecutive rules in a packet classifier. The resulting list of permuted strings is denoted as $\beta(l)$. Bit-swap $\beta$ is a prefix bit-swap for l if $\beta$ is a prefix bit-swap for every string $t_i$ in list l for $1 \leq i \leq n$. Let P(l) denote the set of prefix bit-swaps for list l. It follows that $$P(l) = \bigcap \frac{n}{i} = 1^{P(ti)}.$$

Prefix bit-swaps are useful for compressing classifiers for at least two reasons. First, there are known minimization algorithm that can be used to minimize prefix rule lists. These algorithms depend on the structure of prefix rules to run in polynomial time, so converting rules lists into prefix rules is a preferred step. Second, prefix format facilitates the second key idea of bit weaving, bit merging. Specifically, special properties of prefix format rules to identify candidate rules that be merged together without changing the semantics of the classifier. After bit merging, the classifier is reverted to its original bit order, which typically results in a non-prefix format classifier.

Unfortunately, given a list l of ternary strings, it is possible that P(l)=(/), which means that no bit-swap is a prefix bit-swap for every string in l. For example, the list $\langle 0*, *0 \rangle$ does not have a valid prefix bit-swap. The necessary and sufficient conditions for P(l)=(/) are presented after defining certain notation.

Given ternary strings x and y, let x[i] and y[i] denote the ith ternary bit in x and y respectively. Define the relation $x \subseteq y$ to be shorthand for $\{i|x[i]=*\} \subseteq \{j|y[j]=*\}$. For example, $0*1 \subseteq 1$ but $0 \not\subseteq 0*0$. Two ternary strings $t_1$ and $t_2$ form a cross pattern if and only if $(t_1 \not\subseteq t_2) \wedge (t_2 \not\subseteq t_1)$. In such cases, $t_i$ crosses $t_2$. First, observe that bit swaps have no effect on whether or not two strings cross each other. That is, two ternary strings, $t_1$ and $t_2$, and a bit-swap $\beta$, $t_1 \subseteq t_2$ if and only if $\beta(t_i) \subseteq \beta(t_2)$, and $t_1 \subseteq t_2$ if and only if $\beta(t_1) \subseteq \beta(t_2)$.

Accordingly, given a list $l=\langle t_1, \ldots, t_n \rangle$ of n ternary strings, $P(l) \neq (/)$ if and only if no two ternary strings $t_i$ and tj, ($1 \leq i < j \leq n$) cross each other (referred to as first theorem). The implication is that it is given that there exists a prefix bit-swap $\beta \in P(l)$. Suppose that string $t_i$ crosses string $t_j$, then $\beta(t_i)$ crosses $\beta(t_j)$ according to the observation above. This implies that one of the two ternary strings $\beta(t_i)$ and $\beta(t_j)$ has a * before a 0 or 1 and henceforth is not in prefix format. Thus, $\beta$ is not in P(l), which is a contra-diction.

Conversely, it is given that no two ternary strings cross each other, it follows that we can impose a total order on the ternary strings in l using the relation $\subseteq$. Note, there may be more than one total order if $t_i \subseteq t_j$ and $t_j \subseteq t_i$ for some values of i and j. Lets reorder the ternary strings in 1 according to this total order; that is, $t'_1 \subseteq t'_2 \subseteq \ldots \subseteq t'_{n-1} \subseteq t'_n$. Any bit swap that puts the * bit positions of $t'_1$ last, preceded by the * bit positions of $t'_2, \ldots$, preceded by the * bit positions of $t'_n$, finally preceded by all the remaining bit positions will be a prefix bit-swap for 1. Thus, the result follows.

The first theorem above gives us a simple algorithm for detecting whether a prefix bit-swap exists for a list of ternary strings. If a prefix bit-swap exists, the proof of the theorem yields a simple and elegant algorithm for constructing a prefix bit-swap. That is, simply sort ternary bit positions in increasing order by the number of ternary strings that have a * in that bit position. Psuedo code for this algorithm is set forth below.

| Algorithm 1: Finds a prefix bit-swap |
| --- |
| Input: A classifier C with n rules $r_1, \ldots, r_n$ where each rule has b bits.<br>Output: A Classifier C' that is C after a valid prefix bit-swap.<br>1 Let M[1 ... n, 1 ...b] and D[1 ... n] be the bit matrix and decision array of C;<br>2 Let B = $\langle(i, j) \mid 1 \leq i \leq n$ and j is the number of *'s in M[1... n, ] $\rangle$;<br>3 Sort B in ascending order of each pair's second value;<br>4 Let M' be a copy of M;<br>5 for k := 1 to b do<br>6   Let (i, j) = B[k];<br>7    M'{1... n,k} := M[1 ... n,i];<br>8 Output C' defined by M' and D; |

Figure 3:
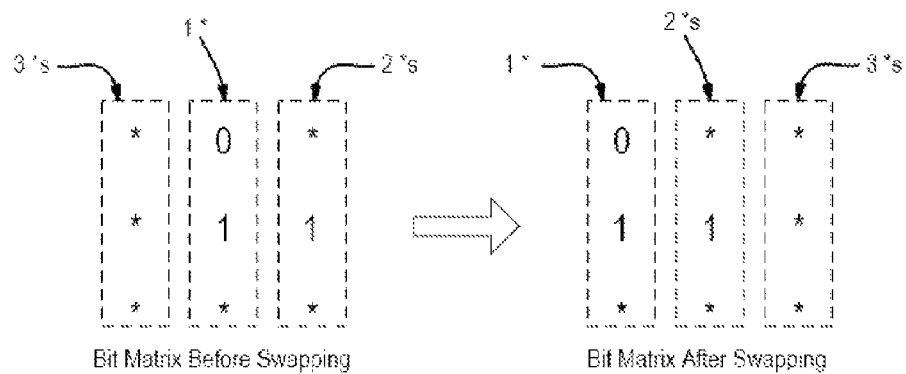
FIG. 3 is a diagram illustrating an example of bit swapping.

Before formally presenting the bit swapping algorithm, the concepts of bit matrix and decision array for a possibly incomplete rule list (i.e., there may exist at least one packet that none of the n, rules matches) are defined. Any list of n rules defines a bit matrix M[1...n,1...b] and a decision array D[1...n], where for any $1 \leq i \leq n$ and $1 \leq j \leq b$, M[i, j] is the j-th bit in the predicate of the i-th rule and D[i] is the decision of the i-th rule. Conversely, a bit matrix M[1 ... n, 1 ... b] and a decision array D[1 ... n] also uniquely defines a rule list. Given a bit matrix M[0 ... n−1, 0 ... b−1] and a decision array D[1 ... n] defined by a rule list, the bit swapping algorithm swaps the columns in M such that for any two columns i and j in the resulting bit matrix M' where i<j, the number of *s in the i-th column is less than or equal to the number of *s in the j-th column. FIG. 3 illustrates an example of bit swapping. Let $L_1$ denote the rule list defined by M and D, and let $L_2$ denote the rule list defined by M' and D. Usually, $L_1$ will not be equivalent to $L_2$. This is not an issue. The key is that if we revert the bit-swap on any rule list $L_3$ that is equivalent to $L_2$, the resulting rule list $L_4$ will be equivalent to $L_1$.

Prior to bit swapping, the rule set is partitioned into one or more partitions in the manner set forth below. Given a classifier C, if P(C)=∅, cut C into partitions where each partition has no cross patterns and thus has a prefix bit-swap. Classifier C is treated as a list of ternary strings by ignoring the decision of each rule.

Given an n-rule classifier $C=\langle r_1, \ldots, r_n \rangle$, a partition P on C is a list of consecutive rules $\langle r_i, \ldots, r_j \rangle$ in C for some i and j such that $1 \leq i \leq j \leq n$. A partitioning, $P_1, \ldots, P_k$, of C is a series of k partitions on C such that the concatenation of $P_1, \ldots, P_k$, is C. A partitioning is cross-free if and only if each partition has no cross patterns. Given a classifier C, a cross-free partitioning with k partitions is minimal if and only if any partitioning of C with k−1 partitions is not cross-free.

To maximize bit weaving's effectiveness, an algorithm is developed that finds a minimal cross-free partitioning for a given classifier. At any time, there is one active partition. In an exemplary embodiment, the initial active partition is started with the last rule of the classifier to facilitate efficient incremental updates. New rules are more likely to be added to the front of a classifier than at the end. Each rule in the classifier is then considered in reverse order.

Specifically, the next rule in the list is retrieved and checked against each rule in the active partition. When the next rule does not "cross" any rule in the active partition, the rule is added to the active partition. The next rule in the list is retrieved and the checking process is repeated. When a rule "crosses" any rule in the active partition, the currently active partition is complete and a new active partition is created using the current rule. The next rule in the list is then retrieved and the checking process continues until each rule in the list has been added to a partition. Psuedo code for this exemplary algorithm is set forth below.

| Algorithm 2: Find a minimal partition |
| --- |
| Input: A list of n rules $\langle r_1, \ldots, r_n \rangle$ each rule has b bits.<br>Output: A list of partitions<br>1 Let P be the current partition (empty list), and L be a list of partitions (empty);<br>2 for i := n to 1 do<br>3   if $r_i$ introduces a cross pattern in P then<br>4     Append P to the head of L;<br>5   else<br>6     Append $r_i$ to the head of P;<br>7 return L; |

Other types of partitioning algorithms are also contemplated within the broader aspects of this disclosure.

The core operation in the above partitioning algorithm is to check whether two ternary strings cross each other. This check requires computing the negation of $x \subseteq y \wedge y \subseteq x$. This computation can be performed in constant time using bitmap representations of sets. An exemplary computation is as follows. For any ternary string t of length m, define the bit mask of t, denoted M(t), to be a binary string of length m where the i-th bit ($0 \leq i < m$) M(t,)[i]=0 if t[i]=* and M(t)[i]=1 otherwise. For any two binary strings a and b, use a && b to denote the resulting binary string of the bitwise logical AND of a and b. For any two ternary string $t_1$, and $t_2$, $t_1$, does not cross $t_2$ if and only if $M(t_1) \&\& M(t_2)$ is equal to $M(t_1)$ or $M(t_2)$ (referred to as the second theorem). For example, given two ternary strings $t_1$=01*0 and $t_2$=101*, whose bit masks are $M(t_1)$=1101 $M(t_1)$=1110, we have $M(t_1) \&\& M(t_2)$=1100. Therefore, $t_1$=01*0 crosses $t_2$=101* because $M(t_1) \&\& M(t_2) \neq M(t_1)$ and $M(t_1) \&\& M(t_2) \neq M(t_2)$. Other techniques for checking whether two ternary strings cross are also contemplated.

Figure 4:
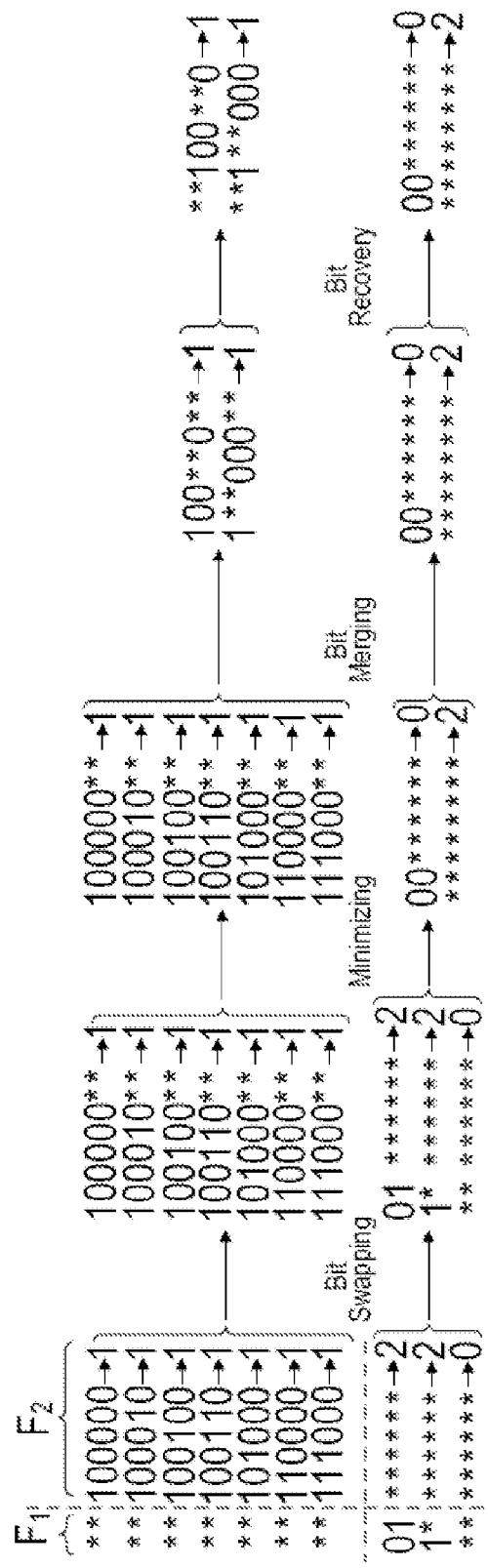
FIG. 4 is a diagram illustrating the bit weaving technique as applied to an example classifier.

FIG. 4 further illustrates the bit weaving algorithm as applied to an example classifier. The input classifier has 10 prefix rules with three decisions (0, 1, and 2) over two fields $F_1$ and $F_2$, where $F_1$ has two bits, and F2 has six bits. The classifier is first partitioned in the manner described above starting with the last rule in the rule set. In this example, the seventh rule introduces a cross pattern with the eighth rule, thereby resulting in a split of the rule set into two partitions. Second, bit swapping is performed on each partition, which converts each partition into a list of one-dimensional prefix rules.

Before bit merging, the ternary strings in each partition may be minimized or reduced using a partial prefix list minimization algorithm. Each partition may be viewed as a list of 1-dimensional prefix rules. If a list of 1-dimensional prefix rules is complete (i.e., any packet has a matching rule in the list), there are known algorithms that can to produce an equivalent minimal prefix rule list. However, the rule list in a given partition is often incomplete; that is, there exist packets that do not match any rule in the partition. There are two reasons why packets will not be classified by any rule in the partition. First, if any of the first k−1 partitions are complete, all later partitions can be deleted without changing the classifier semantics given the first match semantics of TCAMs. Thus, it can be assumed each of the first k−1 partitions do not assign a decision to some packets. Second, for any of the final k−1 partitions, many packets are classified by earlier partitions and thus will not be classified by the given partition even though these packets may match rules in the given partition.

To solve this problem of minimizing incomplete or partial rule lists, the weighted 1-dimensional prefix list minimization algorithm is adapted. Further details regarding the weighted 1-dimensional prefix list minimization algorithm may be found in U.S. patent application Ser. No. 12/578,824 entitled "Systematic Approach Towards Minimizing Packet Classifiers" which is incorporated by reference herein.

Given a 1-dimensional packet classifier f of n prefix rules $\langle r, r_2, \ldots, r_n \rangle$, where {Decision $(r_1)$, Decision, $(r_2)$, . . . , Decision $(r_n)$={$(d_1, d_2, \ldots, d_z$} and each decision $d_i$; is associated with a cost $Cost(d_1)$ (for $1 \leq i \leq z$), the cost of packet classifier f is defined as follows: $Cost(f) = \sum_{i=1}^{n} Cost(Decision(r_1))$. The problem of weighted one-dimensional TCAM minimization is stated as follows: given a one-dimensional packet classifier $f_1$ where each decision is associated with a cost, find a prefix packet classifier $f_2 \in \{f_1\}$ such that for any prefix packet classifier $f \in \{f_1\}$, the condition $Cost(f_2) \leq Cost(f)$ holds. To minimize a partial 1-dimensional prefix rule list L over field F, let $\{d_1, d_2, \ldots, d_z\}$ be the set of all the decisions of the rules in L. Let $\overline{L}$ denote the list of prefix rules that is the complement of L (i.e., any packet has one matching rule in either L or $\overline{L}$, but not both) and each rule in $\overline{L}$ is assigned the same decision $d_{z+1}$ that is not in $\{d_i, d_2, \ldots, d_z\}$). First, assign each decision in $\{d1, d_2, \ldots, d_z\}$ a weight of 1 and the decision $d_{z+1}$ a weight of /D(F)/, the size of the domain F. Second, concatenate L with $\overline{L}$ to form a complete prefix classifier L', and run the weighted 1-dimensional prefix list minimization algorithm on L'. Since this algorithm outputs a prefix classifier whose sum of the decision weights is the minimum, the weight assignment guarantees that decision $d_{z+1}$ only appears in the last rule in the minimized prefix classifier. Let L" be the resulting minimized prefix classifier. Finally, remove the last rule from L". The resulting prefix list is the minimal prefix list that is equivalent to L.

Next, the bit merging process is further explained. When two ternary strings $t_{,1}$ and $t_2$ differ only in one bit, i.e., their hamming distance is one, and the two strings are said to be ternary adjacent. The ternary string produced by replacing the one differing bit by a * in $t_1$ (or $t_2$) is called the ternary cover of $t_1$ and $t_2$. For example, 0** is the ternary cover for 00* and 01*. This process of replacing two ternary adjacent strings by their cover is called bit merging or just merging. For example, merge 00* and 01* to form their cover 0**.

Two rules can be bit merge (or just merge) as follows. For any rule r, use P(r) to denote the predicate of r. Two rules $r_i$ and $r_j$ are ternary adjacent if their predicates $P(r_i)$ and $P(r_j)$ are ternary adjacent. The merger of ternary adjacent rules $r_i$ and $r_j$ is a rule whose predicate is the ternary cover of $P(r_i)$ and $P(r_j)$ and whose decision is the decision of rule $r_i$. Any two rules in a classifier can be merged into one rule without changing the classier se-mantics if and only if they satisfy the following three conditions: (1) they can be moved to be adjacent without changing the semantics of the classifier; (2) they are ternary adjacent; (3) they have the same decision in order to preserve the semantics of the classifier (referred to the third theorem). The basic idea of bit merging is to repeatedly find two rules in the same bit-swapped partition that can be merged based on the three conditions above. Merging rules from different bit swapped partitions is not considered because any two bits from the same column in the two bit-swapped rules may correspond to different columns in the original rules.

To address the first condition above, need to quickly determine what rules in a bit-swapped partition can be moved together without changing the semantics of the partition (or classifier). For any 1-dimensional minimum prefix classifier C, let C' denote the prefix classifier formed by sorting all the rules in C in decreasing order of prefix length. For any two rules $r_i$ and $r_j$ (i<j) in a prefix classifier $\langle r_1, \ldots, r_n \rangle$ that has no upward redundant rules $P(r_i) \cap P(r_j) \neq \emptyset$ if and only if $P(r_i) \subset P(r_j)$ (referred to as a first lemma). Note that a rule r is upward redundant if and only if there are no packets whose first matching rule is r. Clearly, upward redundant rules can be removed from a classifier with no change in semantics.

For any one-dimensional minimum prefix packet classifier C, we have $C \equiv C^s$ (referred to as the fourth theorem) Consider any two rules $r_i$, $r_j$ (i<j) in C. If the prefixes of $r_i$ and $r_j$ do not overlap (i.e., $P(r_i) \cap P(r_j) = (/)$, changing the relative order between $r_i$, and $r_j$ does not change the semantics of C. If the prefixes of $r_i$ and $r_j$ do overlap (i.e., $P(r_i) \cap P(r_j) = (/)$, then according to the first lemma, $P(r_i) \subset P(r_j)$. This means that $P(r_i)$ is strictly longer than $P(r_j)$. This implies that $r_i$ is also listed before $r_j$, in C*. Thus, the result follows.

Given a minimum sized prefix bit-swapped partition, first sort the rules in decreasing order of their prefix length. Second, further partition or group the rules into subgroups based on their prefix length (these subgroups are also referred to herein as prefix chunks). According to the fourth theorem, the order of the rules in each prefix chunk is irrelevant, so the rules can be reordered without changing the semantics of the partition.

To address the second condition in the third theorem, there is a need to quickly determine what rules are ternary adjacent. Based on the fourth theorem, the search space can be significantly reduced by searching for mergeable rules only among the rules which have the same bit mask and decision.

Given a list of rules where the rules have the same decision and no rule's predicate is a proper subset of another rule's predicate, if two rules are mergeable, then the hit masks of their predicates are the same (referred to as the fifth theorem). Suppose in such a list there are two rules $r_i$, and $r_j$ that are mergeable and have different bit masks. Because they are mergeable, $P(r_i)$ and $P(r_j)$ differ in only one bit. Because the bit masks are different, one predicate must have a * and the other predicate must have a 0 or 1 in that bit column. Without loss of generality, let $r_i$ be the rule whose predicate has a *. Because the two rules have the same decision, $P(r_i) \subset P(r_j)$, which is a contradiction.

Given this backdrop, an exemplary bit merging algorithm (BMA) works as follows. BMA takes as input a minimum, possibly incomplete prefix classifier C that corresponds to a cross-free partition generated by bit swapping. BMA first creates classifier $C^s$ by sorting the rules of C in decreasing order of their prefix length and partitions $C^s$ into prefix chunks. Second, for each prefix chunk, BMA groups all the rules with the same bit mask and decision together, eliminates duplicate rules, and searches within each group for mergeable rules. The second step repeats until no group contains rules that can be merged. Let C' denote the output of the algorithm.

Psuedo code for this exemplary bit merging algorithm is set forth below.

---
Algorithm 3: Bit Merging Algorithm
---

Input: A list l of n rules $\langle r_1, \ldots, r_n \rangle$ where each rule has b bits.
    Output: A list of m rules
1  Let S be the set of rules in l;
2  Let C be the partition of S such that each partition contains a maximal set of rules in S such each rule has an identical bitmask and decision;
3  Let OS be an empty set;
4  for each c = $\{r_1', \ldots, r_m'\} \in$ C do
5  |  for i : = 1 to m – 1 do
6  |  |  for j:=i+1 to m do
7  |  |  |  if $P(r_i')$ and $P(r_j')$ are ternary adjacent then
  |  |  |   Add the ternary cover of $P(r_i')$ and $P(r_j')$ to
  |  |_ |_ OS and remove $r_i$ and $r_j$ from c;
  |_ Add c to OS;
8  Let O be OS sorted in decreasing order of their prefix length;
9  if S = OS then
10 |  return O;
11 else
12 |_ return the result of BMA with O as input;

---

Figure 5:
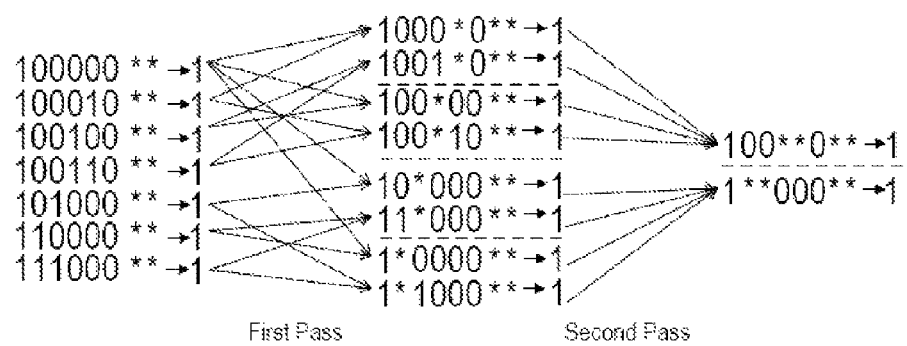
FIG. 5 is a diagram further illustrating the bit merging technique.

This bit merging algorithm is further illustrated in FIG. 5. On the leftmost side of the figure is the first partition taken from the example shown in FIG. 3. On the first pass, eight ternary rules are generated from the original seven. For example, the top two rules produce the rule 1000*0**→1. These eight rules are grouped into four groups with identical bit masks. On the second pass, two unique rules are produced by merging rules from the four groups. Since each rule is in a separate group, no further merges are possible and the algorithm finishes. The correctness of this bit merging algorithm, C'≡C, is guaranteed because only combine mergeable rules.

During each execution of the second step, BMA never introduces two rules $r_i$ and $r_j$ such that $P(r_i) \subset P(r_j)$ where both $r_i$ and $r_j$ have the same decision. Consider any prefix chunk in $C^8$. Let k be the length of the prefix of this prefix chunk. Consider any rule r in C' that was, formed from this prefix chunk. The k-th bit of r must be 0 or 1, not *. The output of BMA, C', contains no pair of mergeable rules.

Within each prefix chunk, after applying BMA, there are no pairs of mergeable rules for two reasons. First, in each run of the second step of the algorithm, all mergeable rules are merged. Second, repeatedly applying the second step of the algorithm guarantees that there are no mergeable rules in the end.

Next, it is shown that any two rules from different prefix chunks cannot be merged. Let $r_i$ and $r_j$ be two rules from two different prefix chunks in C' with the same decision. Suppose $r_i$ is from the prefix chunk of length $k_i$ and $r_j$ is from the prefix chunk of length $k_j$ where $k_i > k_j$. By Lemma 5.3, the $k_i$-th bit of $r_i$'s predicate must be 0 or 1. Because $k_i > k_j$, the $k_i$-th bit of $r_j$'s predicate must be *. Thus, if $r_i$ and $r_j$ are mergeable, then $-r_i$ and $r_j$ should only differ in the $k_i$-th bit of their predicates, which means $P(r_i) \subset P(r_j)$.

Continuing the example in FIG. 4, bit merging is performed on both partitions to reduce the first partition to two rules. Finally, each partition is reverted back to its original bit order. After reverting each partition's bit order, the complete classifier is recovered by appending the partitions together.

The final classifier has four rules. Given an input rule set from a classifier, methods described herein may be implemented by one or more computer programs executed by one or more computer processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage. Output from the computer programs is a compressed rule set that may undergo further processing or be instantiated in a content-addressable memory device.

Redundancy removal procedure may be applied as a preprocessing and/or a post-processing step. Redundancy removal is applied at the beginning because redundant rules may introduce more cross patterns. Redundancy removal is applied at the end because our incomplete 1-dimensional prefix list minimization algorithm may introduce redundant rules across different partitions. An exemplary redundancy removal procedure is further described in an article entitled "Complete redundancy detection in firewalls" by Alex X. Liu and Mohamed G. Gouda, In proc. 19th Annual IFIP Conf. on Data and Applications Security, LNCS 3654, August 2005. Other redundancy removal procedures may be applied.

Classifier rules periodically need to be updated when networking services change. Sometimes classifiers are updated manually by network administrators, in which case the timing is not a concern and rerunning the fast bit weaving algorithm will suffice. Sometimes classifiers are updated automatically in an incremental fashion; in these cases, fast updates may be critically important.

The bit weaving approach set forth herein supports efficient incremental classifier changes by confining change impact to one cross-free partition. An incremental classifier change is typically one of the three actions: inserting a new rule, deleting an existing rule, or modifying a rule. Given a change, first locate the cross-free partition where the change occurs by consulting a precomputed list of all the rules in each partition. Then, rerun the bit weaving algorithm on the affected partition. There may be need to further divide the partition into cross-free partitions if the change introduces a cross pattern. Note that deleting a rule never introduces cross patterns.

Bit weaving, like redundancy removal, never returns a classifier that is larger than its input. Thus, bit weaving, like redundancy removal, can be composed with other classifier minimization schemes. Since bit weaving is an efficient algorithm, it can be applied as a post processing step with little performance penalty. As bit weaving uses techniques that are significantly different than other compression techniques, it can often provide additional compression.

Bit weaving can also enhance other compression techniques. Specifically, multiple techniques rely on generating single field TCAM tables. These approaches generate minimal prefix tables, but minimal prefix tables can be further compressed by applying bit merging. Therefore, every such technique can be enhanced with bit merging (or more generally bit weaving).

For example, TCAM Razor compresses multiple field classifiers by converting a classifier into multiple single field classifiers, finding the minimal prefix classifiers for these classifiers, and then constructing a new prefix field classifier from the prefix lists. A natural enhancement is to use bit merging to convert the minimal prefix rule lists into smaller non-prefix rule lists. Experiments have shown that bit weaving enhanced TCAM Razor yields significantly better compression results than TCAM Razor alone.

Range encoding techniques can also be enhanced by bit merging. Range encoding techniques require lookup tables to encode fields of incoming packets. When such tables are stored in TCAM, they are stored as single field classifiers. Bit merging offers a low cost method to further compress these lookup tables. Results show that bit merging significantly compresses the lookup tables formed by the topological transformation technique.

The most computationally expensive stage of bit weaving is bit merging. With the application of the binomial theorem, we arrive at a worst case time complexity of $O(bxn_2^5)$ where b is the number of bits within a rule predicate, and n is the number of rules in the input. Therefore, bit weaving is the first polynomial-time algorithm with a worst-case time complexity that is independent of the number of fields in that classifier. This complexity analysis excludes redundancy removal because redundancy removal is an optional pre/post-processing step. The space complexity of bit weaving is dominated by finding the minimum prefix list.

The bit weaving approach set forth above has many significant benefits. First, it is the first TCAM compression method that can create non-prefix classifiers. Previous compression methods created only prefix classifiers. This restriction to prefix format may miss important compression opportunities. Second, it is the first efficient compression method with a polynomial worst-case running time with respect to the number of fields in each rule. Third, it is orthogonal to other techniques, which means that it can be run as a pre/post-processing routine in combination with other compression techniques. Fourth, it supports fast incremental updates to classifiers.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for compressing a packet classifier for a computer network system, comprising:
   partitioning a set of rules into one or more partitions, where each rule is expressed as a ternary string of bits that sets forth values for fields in a network packet and a decision for network packets having matching field values;
   for each partition, arranging columns of bits in each ternary string of a given partition from a starting order to another order different than the starting order;
   for each partition, consolidating ternary strings in a given partition into one or more replacement strings;
   for each partition, rearranging columns of bits in the one or more replacement strings of back to the starting order;
   appending the rearranged one or more replacement strings from each of the partitions together to form a compressed packet classifier; and
   instantiating the compressed packet classifier in a content-addressable memory device.

2. The method of claim 1 wherein partitioning a set of rules further comprises
   (a) creating an active partition of rules by selecting a rule from the set of rules;
   (b) retrieving another rule from the set of rules;
   (c) checking the another rule against each rule in the active partition to determine whether columns of bits in ternary strings of rules can be rearranged to form ternary strings having a prefix format; and
   (d) adding the another rule to the active partition and repeating steps (b) through (d) when rules can be rearranged into the prefix format.

3. The method of claim 2 further comprises (e) discontinuing the active partition and creating another partition of rules when rules cannot be rearranged into the prefix format.

4. The method of claim 3 further comprises repeating steps (b) through (e) until each rule in the set of rules has been added to a partition.

5. The method of claim 1 further comprises arranging columns of bits to form ternary strings having a prefix format.

6. The method of claim 1 wherein arranging columns of bits further comprises sorting bit positions of ternary strings in increasing order by a number of ternary strings that have a wildcard character in a bit position.

7. The method of claim 1 further comprises minimizing each partition using a partial prefix list minimization algorithm prior to the step of consolidating ternary strings.

8. The method of claim 1 wherein consolidating ternary strings further comprises merging ternary strings that differ by one bit together.

9. The method of claim 8 wherein merging ternary strings further comprises
   sorting ternary strings in a given partition in decreasing order of prefix length;
   grouping ternary strings having same prefix lengths and same decisions into subgroups;
   comparing ternary strings within each subgroup; and
   merging ternary strings that differ by one bit to create a replacement string by replacing differing bit with a wildcard character in a replacement string.

10. The method of claim 9 further comprises eliminating replacement strings having identical bit values.

11. The method of claim 9 further comprises repeating steps of comparing and merging for a given subgroup until no further ternary strings can be merged within the given subgroup.

12. The method of claim 1 further comprises removing redundant rules from the compressed packet classifier prior to instantiating the compressed packet classifier in a content-addressable memory device.

13. A method for compressing a packet classifier for a computer network system, comprising:
   partitioning a set of rules into one or more partitions, where each rule is expressed as a ternary string of bits that sets forth values for fields in a network packet and a decision for network packets having matching field values;
   arranging, within each partition, columns of bits in each ternary string from a starting order to form ternary strings having a prefix format;
   merging, within each partition, ternary strings that differ by one bit to form replacement strings;
   rearranging, for each partition, columns of bits in the replacement strings back to the starting order;
   appending the rearranged replacement strings from each of the partitions together to form a compressed packet classifier; and
   instantiating the compressed packet classifier in a content-addressable memory device.

14. The method of claim 13 wherein partitioning a set of rules further comprises
   (a) creating an active partition of rules by selecting a rule from the set of rules;

(b) retrieving another rule from the set of rules;

(c) checking the another rule against each rule in the active partition to determine whether the another rule crosses a given rule in the active partition;

(d) adding the another rule to the active partition and repeating steps (b) through (d) when the another rule does not cross any rule in the active partition.

15. The method of claim 14 further comprises (e) discontinuing the active partition and creating another partition of rules when the another rule crosses any rule in the active partition.

16. The method of claim 15 further comprises repeating steps (b) through (e) until each rule in the set of rules has been added to a partition.

17. The method of claim 14 wherein checking the another rule further comprises determining whether columns of bits in ternary strings of rules can rearranged to form ternary strings having a prefix format.

18. The method of claim 13 further comprises arranging columns of bits having values consisting of one, zero, and a wildcard character, such that wildcard characters in each ternary string occupy least significant bit positions.

19. The method of claim 13 wherein arranging columns of bits further comprises sorting bit positions of ternary strings in increasing order by a number of ternary strings that have a wildcard character in a bit position.

20. The method of claim 13 further comprises minimizing each partition using a partial prefix list minimization algorithm prior to the step of merging ternary strings.

21. The method of claim 13 wherein merging ternary strings further comprises replacing the one differing bit with a wildcard character in a replacement string.

22. The method of claim 13 wherein merging ternary strings further comprises:

sorting ternary strings in a given partition in decreasing order of prefix length;

grouping ternary strings having a same prefix length and same decision into subgroups;

comparing ternary strings within each subgroup; and merging ternary strings that differ by one bit to create a replacement string by replacing differing bit with a wildcard character in a replacement string.

23. The method of claim 22 further comprises eliminating replacement strings having identical bit values.

24. The method of claim 23 further comprises repeating steps of comparing and merging for a given subgroup until no further ternary strings can be merged within the given subgroup.

25. The method of claim 13 further comprises removing redundant rules from the compressed packet classifier prior to instantiating the compressed packet classifier in a content-addressable memory device.

* * * * *